US008520358B2

(12) United States Patent
Bessho et al.

(10) Patent No.: US 8,520,358 B2
(45) Date of Patent: Aug. 27, 2013

(54) LIGHTNING-RESISTANT FASTENER, CAP, AND METHOD OF MOUNTING LIGHTNING-RESISTANT FASTENER

(75) Inventors: Masahiro Bessho, Nagoya (JP); Wataru Nishimura, Nagoya (JP); Naomoto Ishikawa, Nagoya (JP); Yuichiro Kamino, Nagoya (JP); Toshikatsu Nohara, Nagoya (JP); Toru Hashigami, Nagoya (JP); Tamaki Tsuzuki, Nagoya (JP)

(73) Assignee: Mitbushi Aircraft Corporation, Aichi (JP)

( * ) Notice: Subject to any disclaimer, the term of this patent is extended or adjusted under 35 U.S.C. 154(b) by 0 days.

(21) Appl. No.: 13/262,036

(22) PCT Filed: Apr. 2, 2010

(86) PCT No.: PCT/JP2010/002429
§ 371 (c)(1),
(2), (4) Date: Dec. 15, 2011

(87) PCT Pub. No.: WO2010/113523
PCT Pub. Date: Oct. 7, 2010

(65) Prior Publication Data
US 2012/0074257 A1 Mar. 29, 2012

(30) Foreign Application Priority Data

Apr. 2, 2009 (JP) .................................. 2009-090552
Dec. 9, 2009 (JP) .................................. 2009-279601

(51) Int. Cl.
*H05F 3/00* (2006.01)

(52) U.S. Cl.
USPC ........................................................ 361/218

(58) Field of Classification Search
USPC ........................................................ 361/218
See application file for complete search history.

(56) References Cited

U.S. PATENT DOCUMENTS 3,897,712 A * 8/1975 Black ............................ 411/373
4,382,049 A * 5/1983 Hofmeister et al. ......... 264/40.1

(Continued)

FOREIGN PATENT DOCUMENTS

GB 2226801 A 7/1990
JP 02-007398 A 1/1990

OTHER PUBLICATIONS

International Search Report for PCT/JP2010/002429; Jun. 15, 2010.

(Continued)

*Primary Examiner* — Ronald W Leja
(74) *Attorney, Agent, or Firm* — Pearne & Gordon LLP

(57) ABSTRACT

There are provided a lightning-resistant fastener and a cap, which, while assuring sufficient insulation properties, provide improved workability and highly stable quality to thereby enable a reduction in the manufacturing cost of an airframe, and a method of mounting the lightning-resistant fastener. A hole 32 is formed in a cap 30, and a screw groove 32a is formed in the hole 32. The configuration enables the cap 30 to be reliably and easily positioned and installed on a fastener member 24 and reliably prevents the cap 30 from coming off after the installation thereof. This improves the workability to reduce the production cost while assuring sufficient insulation properties and enables the cap 30 to be installed with stable quality irrespective of workers. Preferably, the cap 30 is made of a resin in view of mass producibility, weight reduction, and the like.

17 Claims, 9 Drawing Sheets

(56) References Cited

U.S. PATENT DOCUMENTS

| | | | | |
|---|---|---|---|---|
| 4,630,168 A | * | 12/1986 | Hunt | 361/218 |
| 4,755,904 A | * | 7/1988 | Brick | 361/117 |
| 4,905,931 A | * | 3/1990 | Covey | 244/1 A |
| 5,175,665 A | | 12/1992 | Pegg | |
| 5,461,534 A | * | 10/1995 | Gondot et al. | 361/218 |
| 5,709,356 A | * | 1/1998 | Avenet et al. | 244/1 A |
| 2009/0284427 A1 | * | 11/2009 | Ceccom et al. | 343/705 |
| 2011/0226896 A1 | * | 9/2011 | Bessho et al. | 244/1 A |
| 2012/0074257 A1 | * | 3/2012 | Bessho et al. | 244/1 A |
| 2012/0155987 A1 | * | 6/2012 | Watanabe | 411/337 |
| 2012/0234977 A1 | * | 9/2012 | Kawahara et al. | 244/131 |
| 2012/0236457 A1 | * | 9/2012 | Yamakoshi et al. | 361/218 |
| 2012/0250209 A1 | * | 10/2012 | Umemoto et al. | 361/220 |

OTHER PUBLICATIONS

English Translation of International Preliminary Report of Patentability of PCT/JP2010/002429; Nov. 15, 2011.

* cited by examiner

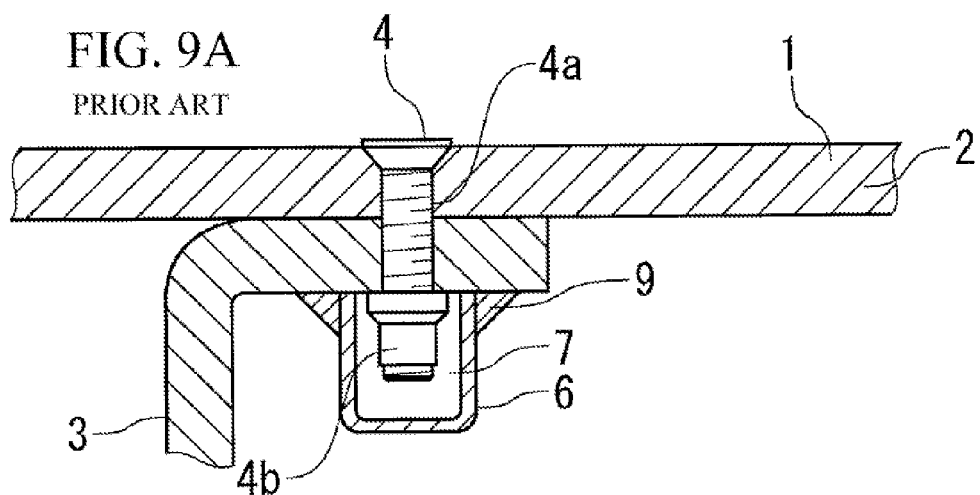
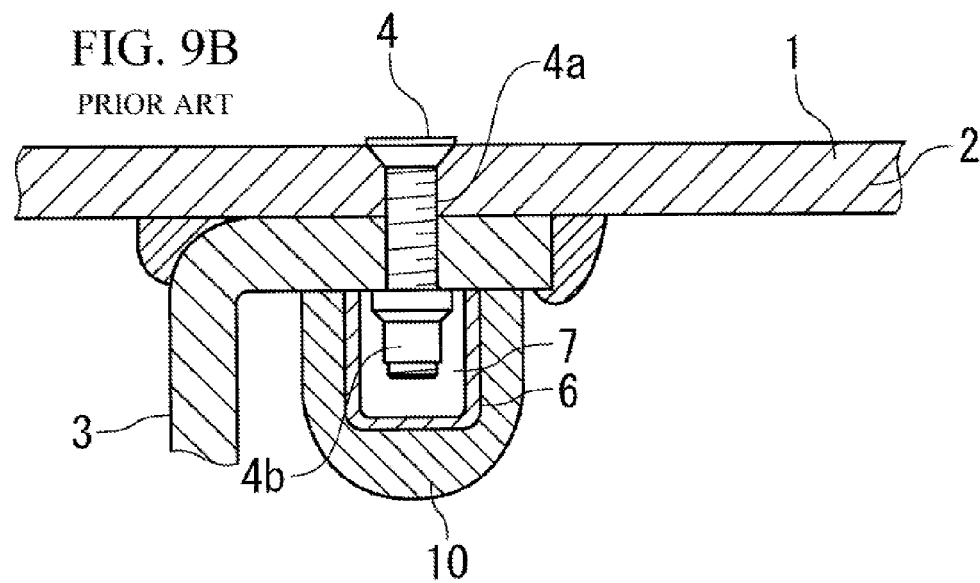

LIGHTNING-RESISTANT FASTENER, CAP, AND METHOD OF MOUNTING LIGHTNING-RESISTANT FASTENER

TECHNICAL FIELD

The present invention relates to a lightning-resistant fastener and a cap, which are used for an airframe of an aircraft, especially for a wind thereof, and a method of mounting a lightning-resistant fastener.

BACKGROUND ART

A wing constituting an airframe of an aircraft is of a hollow construction, and a wing surface panel forming a wing surface is fixed to a structural member existing in the wing by a fastener member (fastener).

The fastener member fastens the wing to the structural member by inserting a pin-shaped fastener main body into through holes, which have been formed in both the wing and the member attached to the wing, from the outside of wing, and by fixing the front end portion of the fastener main body by using a fixture from the interior side of the wing.

The aircraft must make thoroughgoing provisions against lightning strikes. In the case where the wing surface panel and the fastener member are made of different materials, at the time of lightning strikes, an arc discharge (spark) is produced in the direction extending along the interface between the wing surface panel and the fastener member by an electric potential difference between the wing surface panel and the fastener member. Since a fuel tank is housed in the internal space of the wing, it is necessary to reliably suppress the production of arc discharge at the time of lightning strikes.

To meet such necessity, a structure has conventionally been proposed in which, as shown in FIG. 9, on the inside of a wing 1, a cap 6 is installed in a state of being separate from a fastener main body 4a of a fastener member 4, which penetrates a first member 2 corresponding to the wing surface panel and a second member 3 installed within the wing, and a fixture 4b, and an air-gap 7 filled with air is formed between the cap 6 and the fastener main body 4a, the fixture 4b (for example, refer to Patent Literature 1).

CITATION LIST

Patent Document

Patent Document 1: Japanese Patent Laid-Open No. 2-7398

SUMMARY OF THE INVENTION

Technical Problems to be Solved by the Invention

However, the technique descried in Patent Document 1 does not provide a structure in which the cap 6 can be positioned with respect to the fastener member 4, and the installation position of the cap 6 depends on the worker. Therefore, the center of the cap 6 and the center of the fastener member 4 may shift greatly. If in the air-gap 7, a place where a gap between the fastener member 4 and the cap 6 is narrow is produced, the function (insulation properties) of the cap 6 decreases. In the worst case, if the cap 6 is installed in a state of being in contact with the fastener member 4, the function itself of the cap 6 may be impaired greatly.

The cap 6 is installed on the second member 3 with an adhesive 9 as shown in FIG. 9A, or is outer-peripherally covered with a rubber (insulating material) 10 as shown in FIG. 9B. Therefore, in the installation site, the bonding work or the coating work of the rubber 10 is required, so that the work takes much time and labor. Needless to say, the interior of the wing 1 of aircraft has a narrow space, and the above-described work performed at a secluded position provides very poor workability. Moreover, since the fastener member 4 is provided at several thousands to several ten thousands places throughout the wing 1, the deterioration in workability leads directly to the rise in cost.

Furthermore, the above-described work is what is called manual work, so that the work quality is easily varied depending on the worker, which also exerts an influence on the reliability.

The present invention has been made to solve the above-described technical problems, and accordingly an object thereof is to provide a lightning-resistant fastener and a cap, which, while assuring sufficient insulation properties, provide improved workability and highly stable quality to thereby enable a reduction in the manufacturing cost of a wing, and a method of mounting a lightning-resistant fastener.

Solution to the Problems

To achieve the above object, the present invention provides a lightning-resistant fastener comprising a fastener member, which is made of a conductive material, used for fastening a second member on the interior side of an airframe of an aircraft to a first member constituting the airframe; and a cap, which is made of an insulating material, installed so as to cover the fastener member projecting to the interior side of the airframe. In the lightning-resistant fastener, the fastener member comprises an engaging part in a portion projecting to the interior side of the airframe; and the cap comprises an engaged part engaged with the engaging part of the fastener member in the central portion of the inner peripheral surface thereof, and the cap is installed to the fastener member in a state in which the engaging part of the fastener member engages with the engaged part while a gap is provided between the cap and a portion of the fastener member other than the engaged part. By engaging the fastener with the engaged part formed in the cap as described above, the cap can be positioned to the center and installed to the fastener member easily and reliably. As the engaging part and the engaged part, a male screw and a female screw, a convex boss and a concave part corresponding to the convex boss, or the like can be used appropriately.

It is also effective to fill the gap between the cap and the fastener member with an insulating sealant.

The above-described lightning-resistant fastener can be applied to an airframe of an aircraft, not limited to a wing.

In the engaging part or the engaged part, a groove extending along the direction away from the second member is preferably formed. Thereby, when the fastener member is inserted into the engaged part of the cap, the excess of sealant filled in the engaged part can be pushed out through the groove.

The head part of cap may have a shape on which a tool for screwing the cap on the fastener member can be laid. Alternatively, if a worker turns the cap manually, non-slip work is preferably applied onto an outer peripheral surface of the cap.

Also, the cap may comprise a projecting knob part for a worker to turn the cap manually. At this time, the knob part is connected to the cap via a connecting part. If the connecting part is twisted off when the cap is screwed increasingly on the front end part of the fastener member by gripping the knob part and tightening torque thereof reaches a predefined level, the tightening torque of the cap can be controlled easily.

It is preferable that an inside diameter of the inner peripheral surface of the cap gradually decrease toward a side where the engaged part is formed, from an opening end side on the opposite side of the side where the engaged part is formed. Thereby, when the interior of the cap is filled with the sealant, a void can be prevented from being produced in the sealant. Also, when an impact or the like is applied to the cap, only the cap comes off, and the sealant may remain in the front end part of the fastener member as it is.

Also, on the opening end side of the cap, the thickness of the sealant in the radial direction of the cap is preferably set at a predefined value or more. Thereby, even when the cap comes off, the lightning-resistant performance can be assured by the sealant only.

By forming a step part or a flange part projecting toward the outer periphery side on an outer peripheral surface of the fastener member, even when the cap comes off, the sealant can be prevented from coming off the outer surface of the fastener member.

The adhesion strength between the cap and the sealant can also be set so as to be smaller than the adhesion strength between the sealant and the fastener member. Thereby, too, when an impact or the like is applied to the cap, only the cap comes off, and the sealant may remain in the front end part of the fastener member as it is.

The present invention can also provide a cap installed to a front end of a fastener member which fastens a first member and a second member together, wherein the cap is made of an insulating material and is of an umbrella shape; the cap comprises an engaged part on an inner peripheral surface of a top potion of the cap, the engaged part is engaged with an engaging part formed on the fastener member which penetrates the first member and the second member and projects on the second member side; and the cap is installed to the fastener member in a state in which the engaging part of the fastener member engages with the engaged part while a gap is provided between the cap and a portion of the fastener member other than the engaged part. Such a cap can be applied to not only an airframe including a wing of an aircraft made of a composite material but also a fastener member used for fastening members in any other application.

Also, the present invention can provide a method of mounting a lightning-resistant fastener, comprising the steps of causing a fastener main body to penetrate through a first member constituting an airframe of an aircraft and a second member attached to the first member on the interior side of the airframe from an outer periphery side of the airframe in a state in which the first member and the second member are laid on each other; attaching a fixture to the fastener main body from the interior side of the airframe; and engaging an engaged part of a cap with the fastener main body projecting from the fixture on the inside of the airframe by causing the fastener main body to penetrate from the outer periphery side of the airframe.

Also, the method can further comprise a step of filling a sealant on the inner periphery side of the cap, which is made of an insulating material and has an umbrella shape, and comprises the engaged part on an inner peripheral surface of a top portion thereof, before the engaged part of the cap is engaged with a front end of the fastener main body after the fixture is attached to the fastener main body from the interior side of the airframe.

Advantageous Effects of Invention

According to the present invention, the workability is improved to reduce the production cost while sufficient insulation properties are assured, and the cap can be installed at the front end of the fastener member for fastening the second member to the first member with stable quality irrespective of workers.

Also, by filling the gap between the cap and the fastener member with an insulating sealant, the sealability of fastener member against fuel can be assured. Further, since the sealant has a very strong arc preventing effect, even in a state in which the cap is broken, the arc preventing effect is maintained, so that a double arc preventing function can be provided by the cap and the sealant.

BRIEF DESCRIPTION OF DRAWINGS

FIG. 9A is a sectional view showing an example of a conventional lightning-resistant fastener.

FIG. 9B is a sectional view showing another example of a conventional lightning-resistant fastener.

DESCRIPTION OF EMBODIMENTS

The present invention will now be described in detail based on an embodiment shown in the accompanying drawings.

Figure 1:
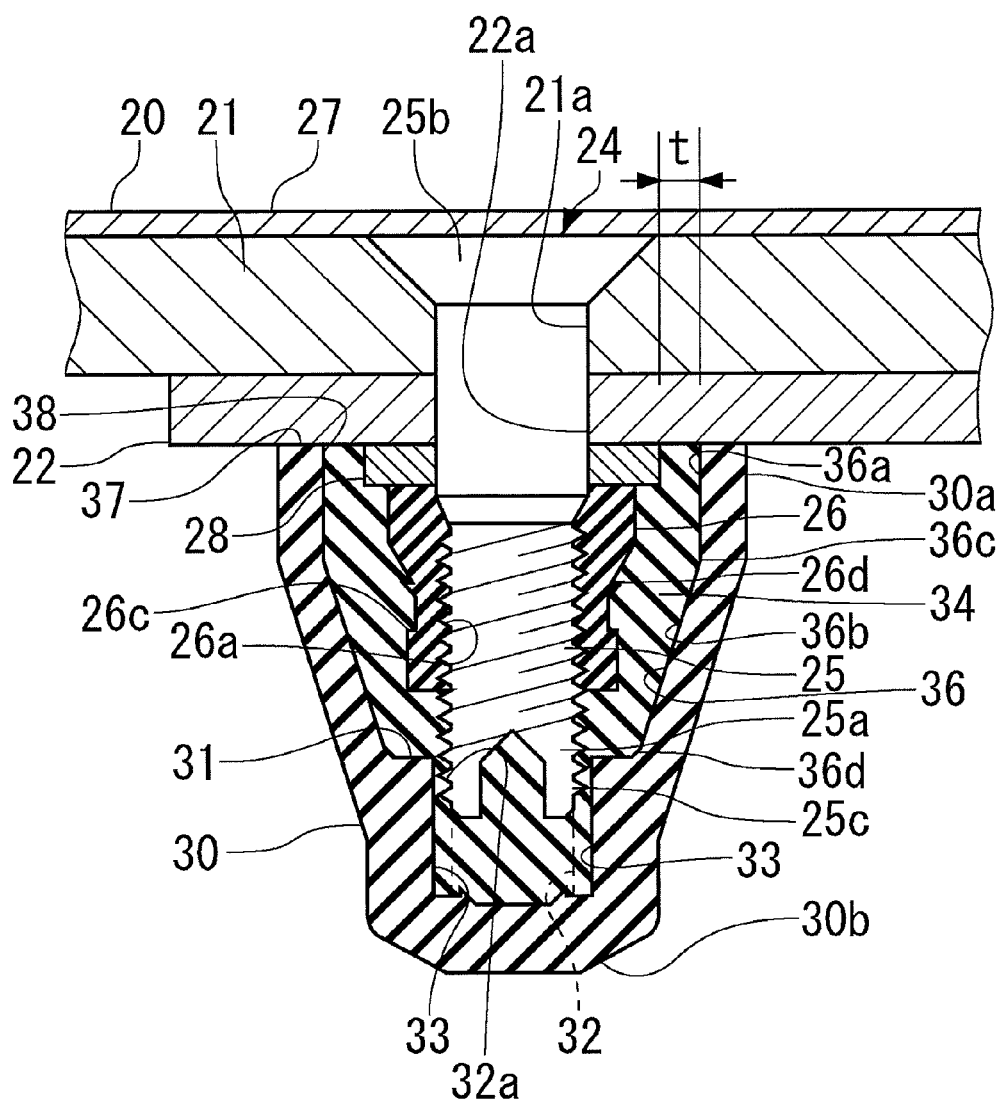
FIG. 1 is a sectional view of a lightning-resistant fastener in accordance with an embodiment of the present invention.

FIG. 1 is a sectional view of a part of a wing constituting an airframe of an aircraft, to which a lightning-resistant fastener, a cap and a method of mounting the lightning-resistant fastener in accordance with this embodiment are applied.

As shown in FIG. 1, a wing 20 comprises a wing panel (first member) 21 as the outer shell thereof. The wing panel 21 is, for example, made of CFRP (Carbon Fiber Reinforced Plastics), which is a composite material of a carbon fiber and a resin, or a metallic material such as an aluminum alloy. A structural member for reinforcement, a fuel tank, and various types of equipment, which are provided within the wing 20, are fixed to the wing panel 21 via a member (second member) 22 such as a stay. The stay is made of a metallic material such as an aluminum alloy. The member 22 such as the stay is installed on the wing panel 21 by using a fastener member 24.

The fastener member 24 comprises a pin-shaped fastener main body 25, a collar 26 mounted on the fastener main body 25 on the interior side of the wing 20, and a washer 28.

The fastener main body 25 and the collar 26 are generally made of a metallic material from the viewpoint of strength. The pin-shaped fastener main body 25 comprises a screw groove (engaging part) 25a on the front end portion thereof. The rear end portion of the pin-shaped fastener main body 25 is formed into a taper-shaped diameter increasing part 25b in which the diameter increases from the front end portion side. This fastener main body 25 is inserted into holes 21a and 22a, which are formed penetratingly in the wing panel 21 and the member 22, from the outside of the wing 20. The front end portion of the pin-shaped fastener main body 25 is projected to the inside of the wing 20 in a state in which the diameter increasing part 25b in the rear end portion is abutted against the taper surface of the hole 21a.

The collar 26 has a tubular shape, and the inner peripheral surface thereof comprises a screw groove 26a engaging with the screw groove 25a of the fastener main body 25. This collar 26 is screwed onto the screw groove 25a of the fastener main body 25 projecting to the inside of the wing 20. Thereby, the wing panel 21 and the member 22 are held between the diameter increasing part 25b of the fastener main body 25 and the collar 26, and thereby the member 22 is fixed to the wing panel 21.

In this state, a front end part 25c of the fastener main body 25 projects to the inner periphery side of the wing 20 from the collar 26, and further a certain length of the screw groove 25a is exposed to the inner periphery side of the wing 20 from the collar 26.

If uncoated, the rear end portion of the fastener main body 25 is exposed to the surface of the wing 20. Therefore, in the case where the wing 20 is made of a composite material, the whole surface of the wing 20, and the rear end portion of the fastener main body 25 are covered with a paint film 27 made of a paint containing Cu (copper). Thereby, an electric current is prevented from concentrating on the fastener member 24 at the time of lightning strikes.

Also, to protect the fastener main body 25 from a direct strike of lightning, it is preferable that the surface of the fastener main body 25 be coated with an insulating material such as a resin.

The washer 28 has an annular shape with a predetermined thickness, and is made of an insulating material such as polyimide. By constructing the washer 28 of an insulating material, an arc discharge is prevented from being produced at the interface between the member 22 and the washer 28.

In the internal space of the wing 20, a cap 30 is mounted on the fastener member 24, and the interior of the cap 30 is filled with an insulating sealant 34.

Figure 2A:
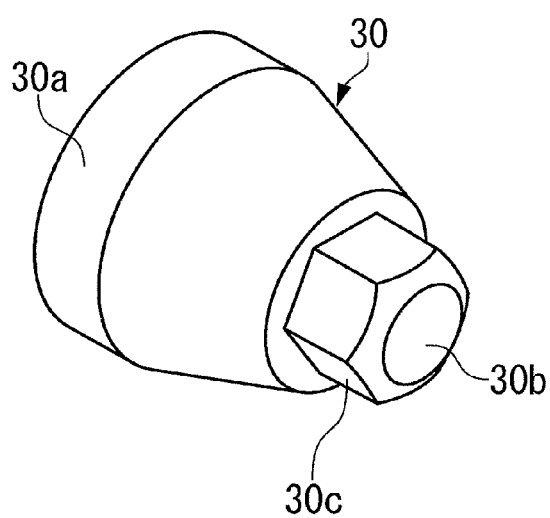
FIGS. 2A and 2B are is a perspective views of a cap.
Figure 2B:
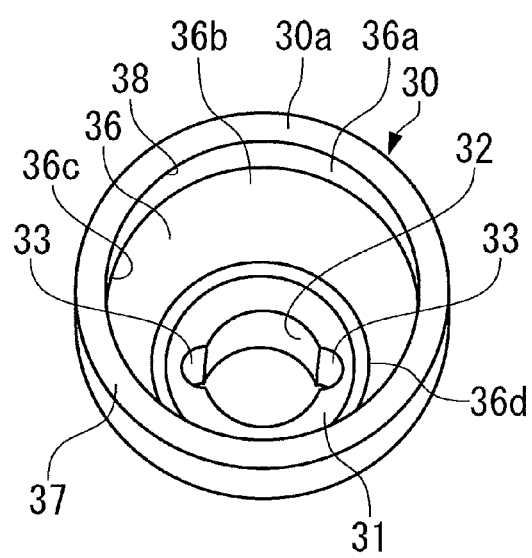
Figure 3:
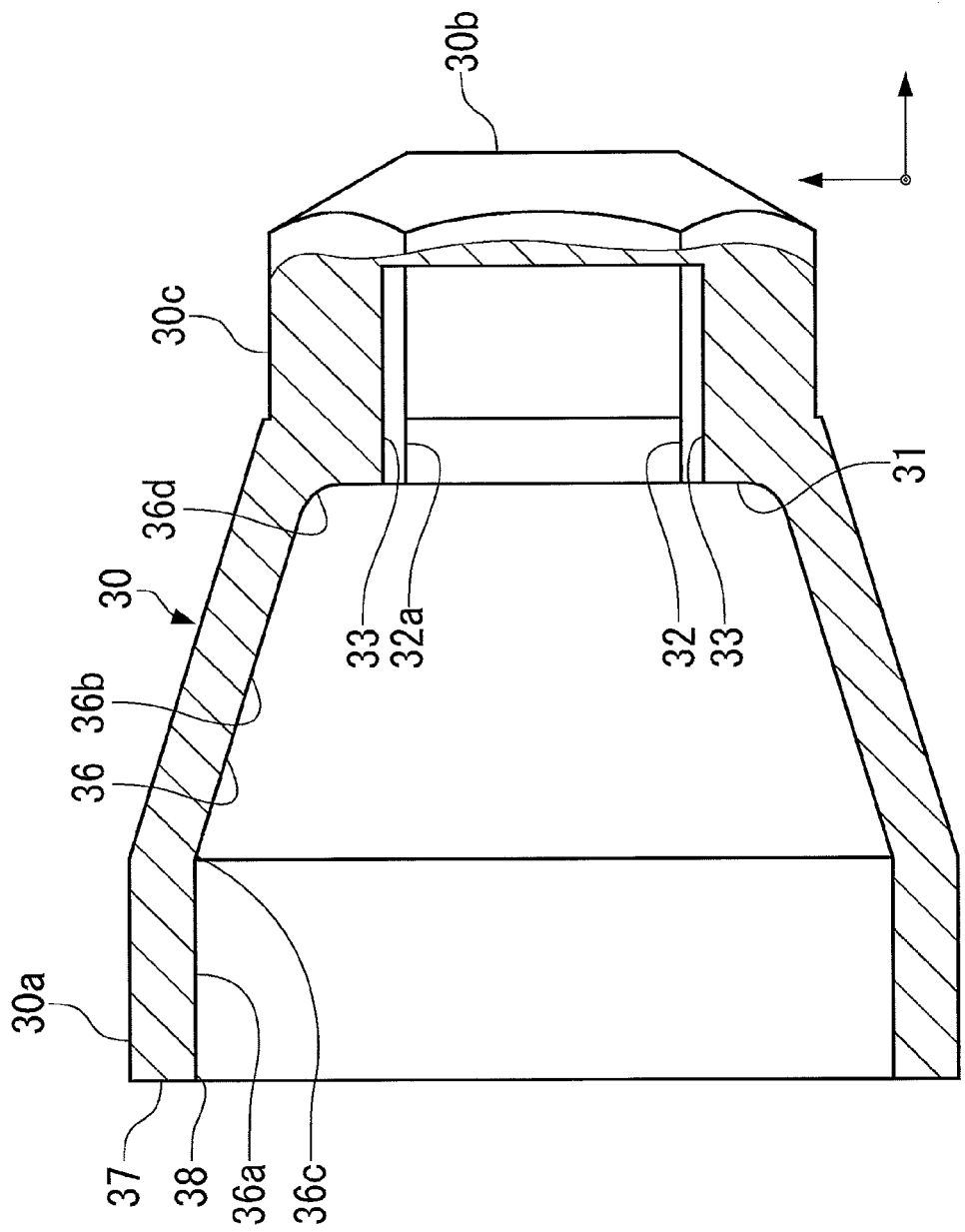
FIG. 3 is a sectional view of the cap.

As shown in FIGS. 2 and 3, the cap 30 has a circular cross section, and has a shape such that only the one end part 30a side is open, and the inside diameter and the outside diameter thereof decrease gradually toward the other end part 30b side. This cap is preferably made of an insulating resin such as PPS (polyphenylene sulfide resin), polyimide, PEEK (polyether ether ketone resin), and nylon resin.

On the inner peripheral surface on the other end part 30b side (hereinafter, the inner peripheral surface is referred to as a bottom surface 31) of the cap 30, a bottomed hole (engaged part) 32 having a circular cross section is formed. The inner peripheral surface of the hole 32 comprises a screw groove 32a engaged with the screw groove 25a of the fastener main body 25. This cap 30 is configured so that in a state in which the end surface of the one end part 30a is pushed against the member 22, the front end part 25c of the fastener main body 25 is inserted into the hole 32. At this time, the screw groove 32a of the cap 30 engages with the screw groove 25a of the fastener main body 25, whereby the cap 30 can be positioned and fixed to the fastener member 24 easily and reliably.

For this cap 30, the inside diameter of an inner peripheral surface 36 is set so that when the cap 30 is installed on the fastener member 24, a predetermined gap is formed with respect to the washer 28, the fastener main body 25, and the collar 26. In particular, the cap 30 is formed so that in the one end part 30a on the opening side of the cap 30, a gap not smaller than a predetermined dimension t can be assured between the inner peripheral surface of the cap 30 and the washer 28 and the fastener main body 25.

For the inner peripheral surface 36 of the cap 30, the one end part 30a side thereof is formed into a straight part 36a in which the inside diameter thereof is constant, and further a tapered part 36b in which the inside diameter thereof decreases gradually is formed from the straight part 36a toward the hole 32.

A corner part 36c where the straight part 36a and the tapered part 36b are adjacent to each other and a corner part 36d where the tapered part 36b and the hole 32 are adjacent to each other are of a rounded shape having a predetermined radius of curvature.

Thus, the inner peripheral surface 36 of the cap 30 is formed into a surface continuous smoothly from the straight part 36a, to the corner part 36c, the tapered part 36b, and the corner part 36d. Thereby, when the cap 30 is filled with the sealant 34, air is prevented from being caught in the sealant 34 or a void is prevented from being produced in the sealant 34 on the inner peripheral surface 36 (especially, in the corner parts 36c and 36d).

In the state in which the cap 30 is installed on the fastener member 24, the interior of the cap 30 is filled with the insulating sealant 34. By the interposition of the sealant 34 between the inner peripheral surface of the cap 30 and the fastener main body 25 and the collar 26, the insulation properties between the cap 30 and the fastener member 24 are further enhanced. In the one end part 30a on the opening side of the cap 30, since the sealant 34 between the inner peripheral surface 36 of the cap 30 and the washer 28 and the fastener main body 25 has a thickness not smaller than the predetermined dimension t, the insulation properties at the interface between the inner peripheral surface 36 of the cap 30 and the washer 28 and the fastener main body 25 can be assured.

When the cap 30 is installed on the fastener member 24 for fastening the wing panel 21 and the member 22 together, the interior of the cap 30 is beforehand filled with the uncured sealant 34. In the internal space of the wing 20, the cap 30 is pushed against the fastener main body 25 of the fastener member 24 projecting to the inside.

At this time, the sealant 34 filled in the cap 30 overflows through the opening portion of the one end part 30a of the cap 30. It is preferable that the sealant 34 overflow from the entire periphery of the cap 30 so that the sealant 34 spreads uniformly to the entire zone in the cap 30. For this purpose, it is preferable that a surface 37 of the one end part 30a of the cap 30 be a flat and smooth surface, and also it is preferable that an inner peripheral edge part 38 of the one end part 30a be formed in such a manner that burrs, flashes and the like are not produced.

When the cap 30 is pushed against the fastener main body 25 increasingly, since the hole 32 is formed in the cap 30, the fastener member 24 can be positioned reliably and easily at the center of the cap 30. Thereby, a phenomenon can be prevented that the cap 30 and the fastener member 24 shift from each other and the gap between the cap 30 and the fastener member 24 becomes narrow depending on the place, and also a phenomenon can be prevented that the fastener member 24 comes into direct contact with the cap 30.

For ease of positioning of the cap 30 relative to the fastener member 24, it is also effective to make the peripheral edge portion of the hole 32 a tapered surface in which the inside diameter thereof decreases gradually toward the depth side of the hole 32.

After the hole 32 of the cap 30 has been pushed against the fastener main body 25, the cap 30 is turned to be screwed on the fastener main body 25.

At this time, if the interior of the hole 32 is filled with the sealant 34, the front end part 25c of the fastener main body 25 is inserted into the hole 32. When the fastener main body 25 intrudes further into the hole 32 with the screwing of the cap 30, the sealant 34 in the hole 32 has nowhere to go, and the pressure of the sealant 34 increases, so that the front end part of the fastener main body 25 cannot sometimes be inserted to a predetermined depth of the hole 32.

Accordingly, it is preferable that a groove 33 extending along the center axis direction of the hole 32 be formed at least at one place in the inner peripheral surface of the hole 32 of the cap 30. In the example shown in FIGS. 2 and 3, two grooves 33 are formed in the hole 32. Needless to say, three or more grooves 33 can be formed.

If the groove 33 is formed in the hole 32 as described above, when the front end part of the fastener main body 25 is inserted into the hole 32, the excess sealant in the hole 32 is pushed out of the hole 32 through the groove 33. Thereby, a void is prevented from remaining in the sealant 34 in the hole 32, and also the insertion of the fastener main body 25 into the hole 32, that is, the installation of the cap 30 on the fastener member 24 can be accomplished easily.

When the cap 30 is screwed until the end surface of the one end part 30a of the cap 30 is pushed against the member 22, the screwing of the cap 30 is finished. In this state, the screw groove 25a formed on the fastener main body 25 engages with the screw groove 32a formed in the hole 32 of the cap 30, so that the cap 30 is reliably and fixedly held to the fastener member 24.

Also, if the filling sealant 34 is cured, this sealant 34 also achieves an effect of fixing the cap 30 to the fastener member 24.

Thus, the fastener member 24 on which the cap 30 is installed is a lightning-resistant fastener.

If something hits against the outer peripheral surface of the cap 30, the cap 30 may be removed by the hitting impact or the like. Even in such a case, it is preferable that the cured sealant 34 do not come off together with the cap 30, and the sealant 34 be kept in a state of covering the head portion of the fastener main body 25.

For this purpose, it is preferable that the material of the sealant 34 be selected so that the adhesion strength between the cap 30 and the sealant 34 is smaller than the adhesion strength between the sealant 34 and the fastener member 24. When the adhesion strength between the cap 30 and the sealant 34 is smaller than the adhesion strength between the sealant 34 and the fastener member 24 as described above, even if an impact or the like is applied to the cap 30, the cap 30 separates from the sealant 34 and only the cap 30 comes off, and the fastener member 24 is kept in a state of being covered with the sealant 34, so that the lightning-resistant performance can be maintained.

To prevent the sealant 34 from coming off the fastener 24, for example, a step part 26c expanding toward the outer periphery side, a flange part 26d, or the like may be formed on the outer peripheral surface of the collar 26.

The cap 30 may be screwed by a worker by using a tool or may be screwed by hand.

For example, in the case where the cap 30 is screwed by a worker by using a tool, as shown in FIGS. 2 and 3, a head part 30c of the other end part 30b of the cap 30 can be formed into a hexagonal shape, a hexagon socket shape, or the like corresponding to the shape of tool.

Figure 4:
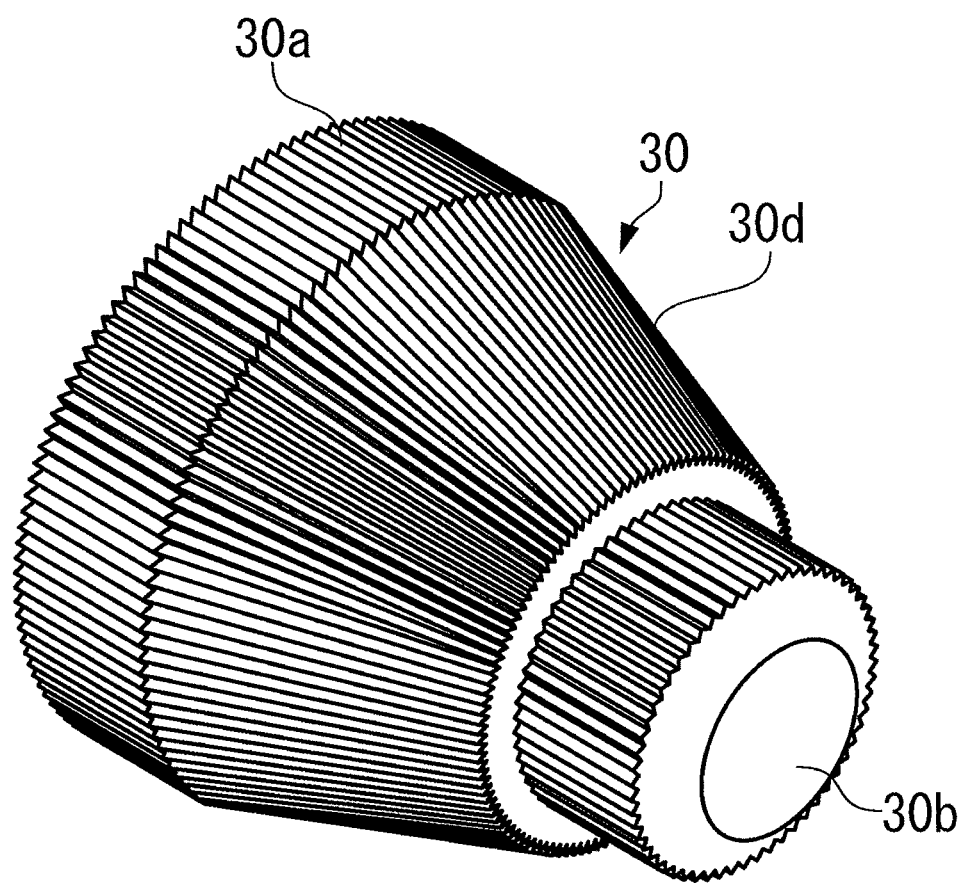
FIG. 4 is a perspective view showing an example in which an outer peripheral surface of a cap has been subjected to slitting processing.
Figure 5:
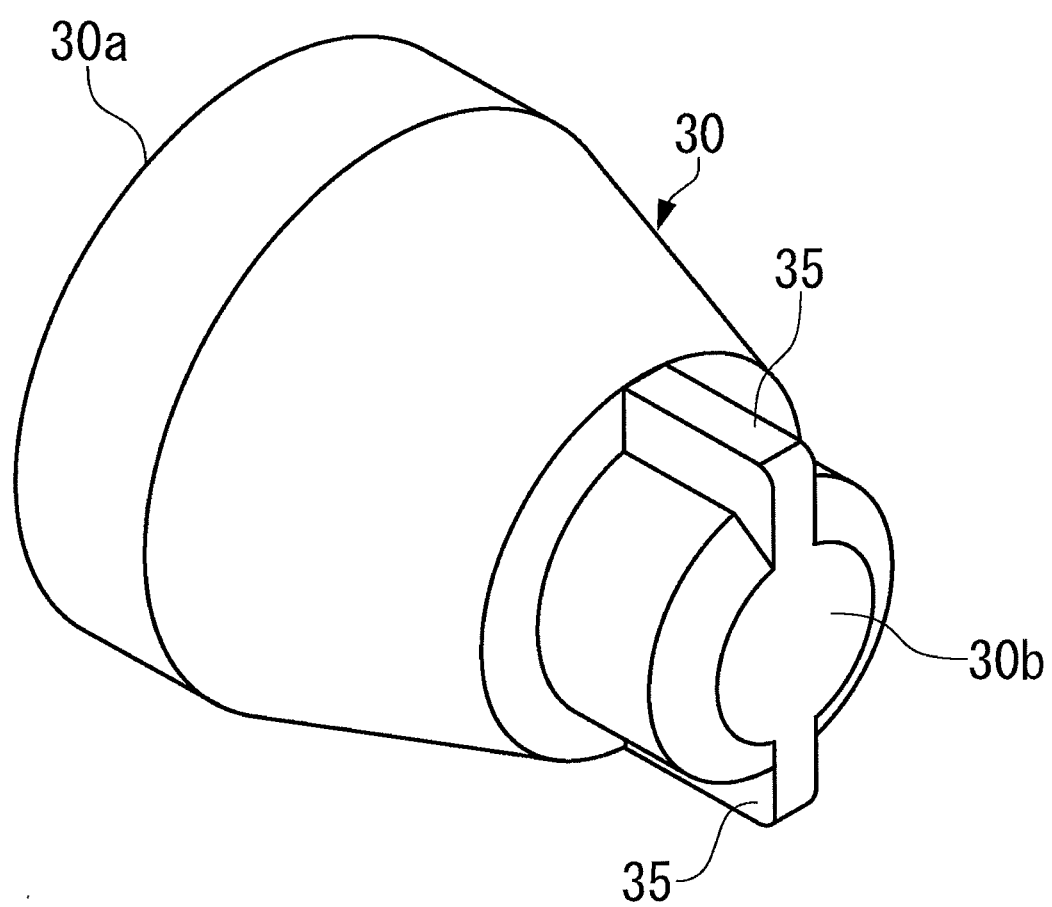
FIG. 5 is a perspective view showing an example in which protrusions are provided in a head portion of a cap.

Also, in the case where the cap 30 is screwed by a worker by hand, as shown in FIG. 4, an outer peripheral surface 30d of the cap 30 can be formed so as to be non-slip surface by being subjected to slitting processing, knurling processing, diamond cutting processing, or the like. In the example shown in FIG. 4, the whole of the outer peripheral surface 30d of the cap 30 is subjected to slitting processing. Needless to say, however, only a part thereof may be subjected to slitting processing. Furthermore, as shown in FIG. 5, a plurality of (two or more) protrusions 35 may be formed at intervals in the circumferential direction in the other end part 30b of the cap 30. The number and the shapes of the protrusions 35 are not subject to any special restriction.

Figure 6:
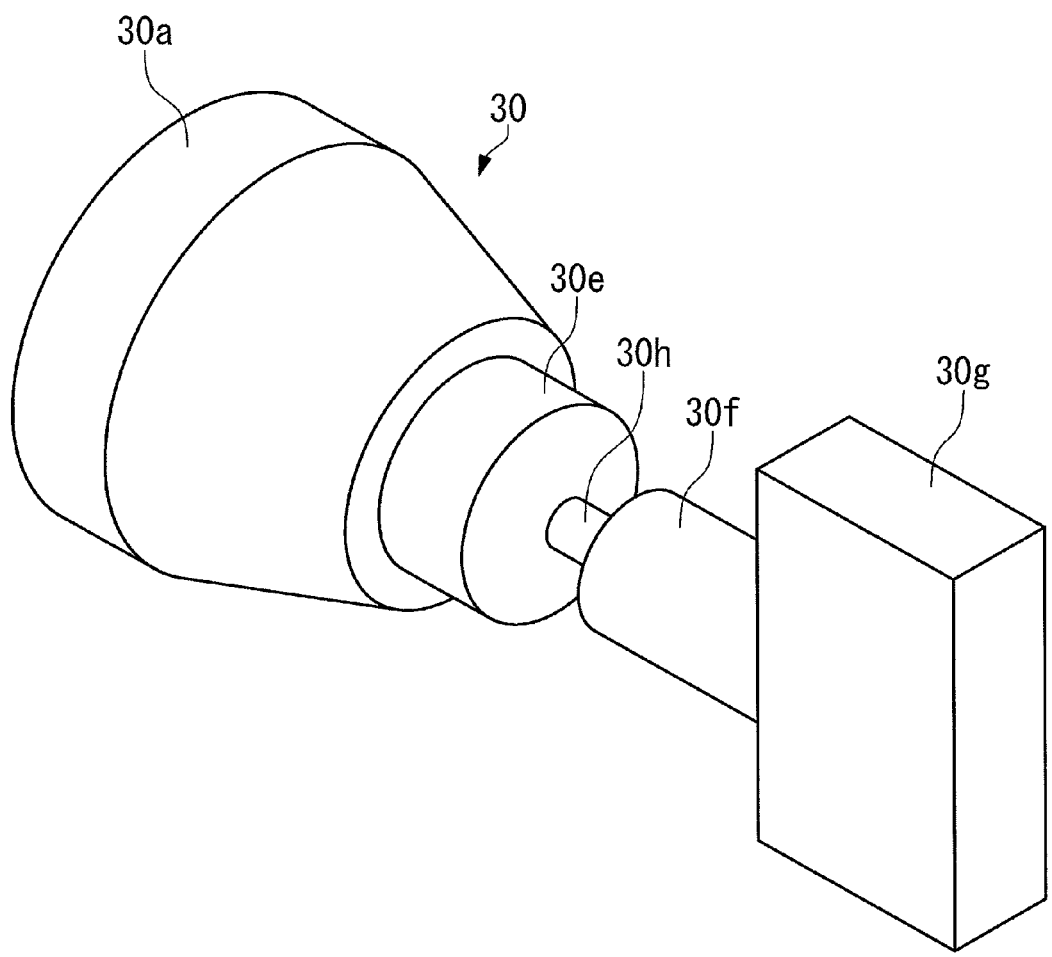
FIG. 6 is a perspective view showing an example in which a knob part is provided in a head part of a cap.

Additionally, as shown in FIG. 6, a head part 30e of the cap 30 can be provided with a knob part 30g having an appropriate shape via a rod part 30f having a predetermined outside diameter. In this configuration, a worker installs the cap 30 on the fastener member 24 by turning the knob part 30g. A part 30h of the rod part 30f may be thinned to set the strength thereof such that the thinned part 30h of the rod part 30f is twisted off when a predefined tightening torque of the cap 30 is reached. Thereby, the worker can install the cap 30 by tightening it reliably with the predefined torque.

As described above, the cap comprises the hole 32, and the screw groove 32a is formed in the hole 32, whereby the cap 30 can be positioned and installed reliably and easily on the fastener member 24, and even after installation, the cap can be reliably prevented from coming off.

Also, if the cap 30 has been screwed on the fastener member 24, the cure of the sealant 34 need not be waited, and the installation work of the cap 30 can be performed rapidly.

Thereby, while the insulation properties are assured reliably, the workability is improved to reduce the manufacturing cost, and the cap 30 can be installed with stable quality irrespective of workers.

Also, if the cap 30 is made of a resin, the mass production thereof is easy to do, and therefore the manufacturing cost can be reduced. Also, the wall thickness of the cap 30 can be controlled easily by mass production, so that the weight of the cap 30 can be reduced.

The above-described cap 30 can also be formed by cutting processing, but is preferably formed by injection molding considering the mass producibility. In the case of injection molding, it is difficult to form the screw groove 32a in the hole 32 (after formation, the cap 30 must be removed by being rotated), so that the screw groove 32a may be formed by screwing a heli-sert in the hole 32.

Figure 7:
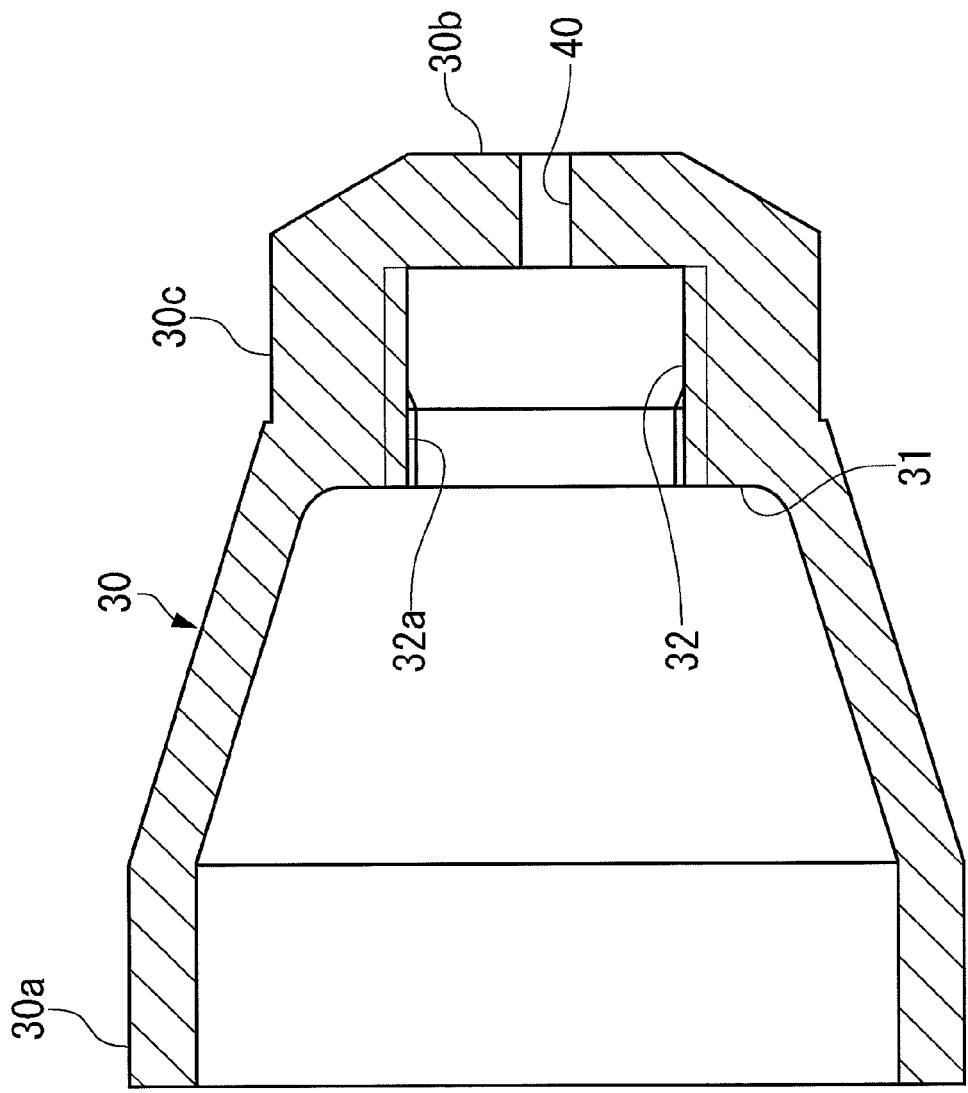
FIG. 7 is a sectional view showing another example of a cap.

In the above-described embodiment, by forming the grooves 33 in the hole 32, the excess of the sealant 34 filled in the hole 32 is pushed out. However, the configuration is not limited to this one. For example, as shown in FIG. 7, a through hole 40 may be formed in the head part 30c of the cap 30 so that the excess sealant 34 is pushed out to the outside of the cap 30 via this through hole 40.

Also, in the above-described embodiment, the cap 30 is screwed on the screw groove 25a formed in the front end part of the fastener main body 25 of the fastener member 24. However, other different configurations may be adopted if the cap 30 is screwed on a portion projecting to the inside of the wing 20 of the fastener member 24.

Figure 8:
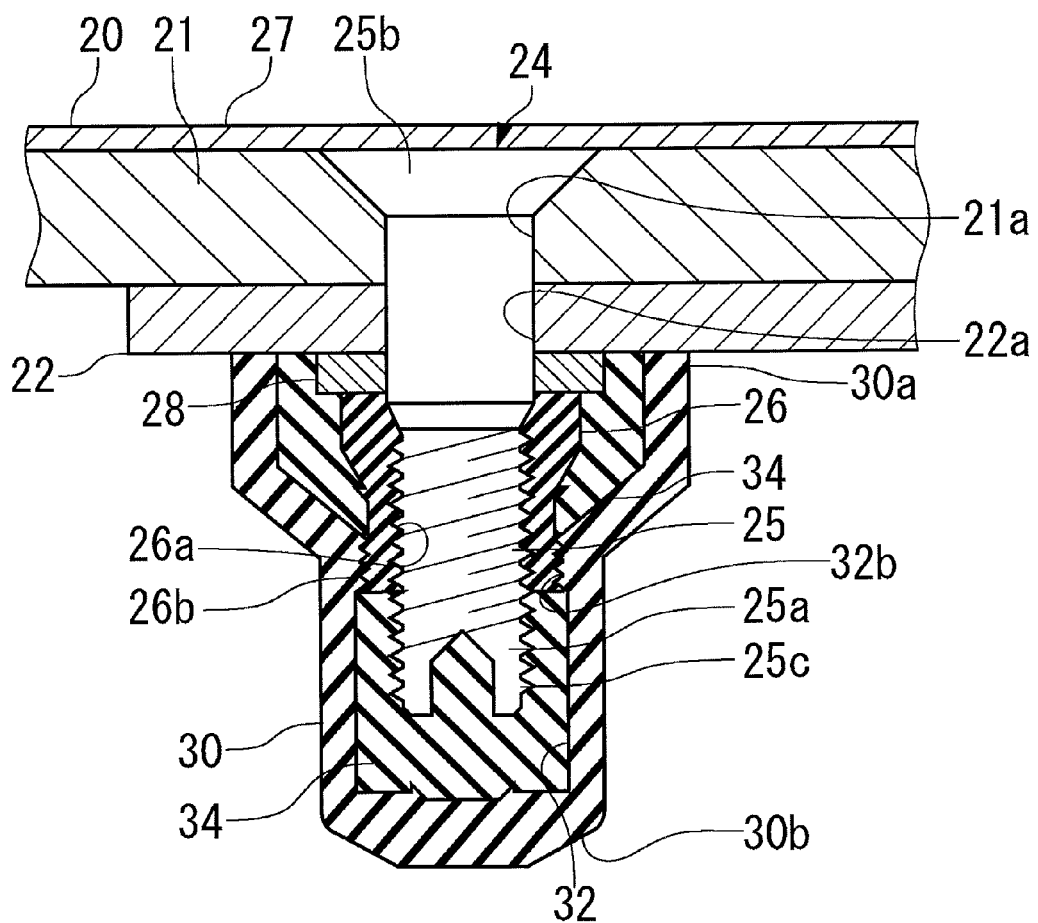
FIG. 8 is a sectional view showing another example of the lightning-resistant fastener in accordance with an embodiment of the present invention.

For example, as shown in FIG. 8, a screw groove 26b may be formed on the outer peripheral surface of the collar 26 installed on the fastener main body 25 on the interior side of the wing 20 so that the screw groove 32b formed on the inner peripheral surface of the cap 30 is screwed on this screw groove 26b.

Further, the configuration is not limited to one in which the cap 30 is screwed on the screw groove 25a formed in the front end part of the fastener main body 25 of the fastener member 24. The configuration can be made such that the cap 30 is fitted on the front end part of the fastener main body 25. In this case, for example, a configuration can be adopted in which a groove or a ridge continuous in the circumferential direction is formed on the outer peripheral surface of the front end part of the fastener main body 25, and a convex or a protrusion engaging with the groove of the fastener main body 25 is formed or a groove engaging with the ridge of the fastener main body is formed, whereby the cap 30 is fitted on the fastener main body 25.

Besides, the configurations described in the above embodiment can be selected or can be changed as appropriate to other configurations without departing from the gist of the present invention.

REFERENCE SIGNS LIST

20 ... wing, 21 ... wing panel (first member), 21a ... hole, 22 ... member (second member), 24 ... fastener member, 25 ... fastener main body, 25a ... screw groove (engaging part), 25b ... diameter increasing part, 25c ... front end part, 26 ... collar, 26a ... screw groove, 30 ... cap, 30a ... one end part, 30b ... the other end part, 30c ... head part, 30d ... outer peripheral surface, 30e ... head part, 30f ... rod part, 30g ... knob part, 31 ... bottom surface, 32 ... hole (engaged part), 32a ... screw groove, 33 ... groove, 34 ... sealant, 35 ... protrusion, 40 ... through hole

The invention claimed is:

1. A lightning-resistant fastener comprising:
a fastener member, which is made of a conductive material, used for fastening a second member on the interior side of an airframe of an aircraft to a first member constituting the airframe; and
a cap, which is made of an insulating material, installed so as to cover the fastener member projecting to the interior side of the airframe, wherein
the fastener member comprises an engaging part in a portion projecting to the interior side of the airframe; and
the cap comprises an engaged part engaged with the engaging part of the fastener member in the central portion of the inner peripheral surface thereof, and
the cap is installed to the fastener member in a state in which the engaging part of the fastener member engages with the engaged part while a gap is provided between the cap and a portion of the fastener member other than the engaged part.

2. The lightning-resistant fastener according to claim 1, wherein the gap is filled with an insulating sealant.

3. The lightning-resistant fastener according to claim 2, wherein a groove extending along the direction away from the second member is formed in the engaging part or the engaged part.

4. The lightning-resistant fastener according to claim 1, wherein a head part of the cap has a shape on which a tool for screwing the cap on the fastener member can be laid.

5. The lightning-resistant fastener according to claim 1, wherein non-slip work surface is applied onto an outer peripheral surface of the cap.

6. The lightning-resistant fastener according to claim 1, wherein the cap comprises a projecting knob part for a worker to turn the cap manually.

7. The lightning-resistant fastener according to claim 6, wherein the knob part is connected to the cap via a connecting part, and the connecting part is twisted off when the cap is screwed increasingly on the front end part of the fastener member by gripping the knob part and tightening torque thereof reaches a predefined level.

8. The lightning-resistant fastener according to claim 1, wherein the inside diameter of the inner peripheral surface of the cap gradually decrease toward a side where the engaged part is formed, from an opening end side on the opposite side of the side where the engaged part is formed.

9. The lightning-resistant fastener according to claim 8, wherein on the opening end side of the cap, the thickness of the sealant in the radial direction of the cap is set at a predefined value or more.

10. The lightning-resistant fastener according to claim 1, wherein a step part or a flange part projecting toward the outer periphery side is formed on an outer peripheral surface of the fastener member.

11. The lightning-resistant fastener according to claim 1, wherein the adhesion strength between the cap and the sealant is smaller than the adhesion strength between the sealant and the fastener member.

12. A cap installed to a front end of a fastener member which fastens a first member and a second member together, wherein
the cap is made of an insulating material; the cap comprises an engaged part on an inner peripheral surface of a top potion of the cap, the engaged part is engaged with an engaging part formed on the fastener member which penetrates the first member and the second member and projects on the second member side; and
the cap is installed to the fastener member in a state in which the engaging part of the fastener member engages with the engaged part while a gap is provided between the cap and a portion of the fastener member other than the engaged part.

13. A method of mounting a lightning-resistant fastener, comprising ti of:
causing a fastener main body to penetrate through a first member constituting an airframe of an aircraft and a second member attached to the first member on the interior side of the airframe from an outer periphery side of the airframe in a state in which the first member and the second member are laid on each other;
installing a fixture to the fastener main body from the interior side of the airframe; and
engaging an engaged part of a cap with the fastener main body projecting from the fixture on the inside of the airframe by causing the fastener main body to penetrate from the outer periphery side of the airframe.

14. The method of mounting a lightning-resistant fastener according to claim 13, wherein the method further comprises a step of filling a sealant on the inner periphery side of the cap, which is made of an insulating material and has an umbrella shape, and comprises the engaged part on an inner peripheral surface of a top portion of the cap, before the engaged part of the cap is engaged with the fastener main body and after the fixture is attached from the interior side of the airframe.

15. The lightning-resistant fastener according to claim 1, wherein,
the cap is installed to the fastener member in a state in which the gap is provided between a part or whole of a portion of the cap other than the engaged part and the portion of the fastener member.

16. The cap according to claim 12, wherein,
the cap is installed to the fastener member in a state in which the gap is provided between a part or whole of a portion of the cap other than the engaged part and the portion of the fastener member.

17. An aircraft comprising the lightning-resistant fastener according to claim 1.

\* \* \* \* \*

UNITED STATES PATENT AND TRADEMARK OFFICE
CERTIFICATE OF CORRECTION

PATENT NO. : 8,520,358 B2
APPLICATION NO. : 13/262036
DATED : August 27, 2013
INVENTOR(S) : Masahiro Bessho et al.

It is certified that error appears in the above-identified patent and that said Letters Patent is hereby corrected as shown below:

In the Claims

Column 10, line 35, Claim 13, please replace "comprising ti of:" with -- comprising the steps of: --

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.         : 8,520,358 B2                                                Page 1 of 1
APPLICATION NO.    : 13/262036
DATED              : August 27, 2013
INVENTOR(S)        : Bessho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 60 days.

Signed and Sealed this
Fifteenth Day of September, 2015

Michelle K. Lee
*Director of the United States Patent and Trademark Office*